United States Patent [19]
Kirsch

[11] 4,390,873
[45] Jun. 28, 1983

[54] ELECTRONIC MOUSE

[76] Inventor: Steven T. Kirsch, 655 S. Fairoaks Ave., Apt. D313, Sunnyvale, Calif. 94086

[21] Appl. No.: 264,478

[22] Filed: May 18, 1981

[51] Int. Cl.³ ............................................. G08B 5/36
[52] U.S. Cl. .................................... 340/710; 178/18; 250/237 R; 340/707; 340/365 P
[58] Field of Search ............ 340/706, 707, 710, 365 P; 250/237 R; 178/18

[56] References Cited

U.S. PATENT DOCUMENTS

| | | | |
|---|---|---|---|
| 3,182,291 | 5/1965 | Nassimbene | 340/146.3 |
| 3,297,879 | 1/1967 | Meyer | 250/237 |
| 3,541,521 | 11/1970 | Koster | 340/710 X |
| 3,541,541 | 11/1970 | Engelbart | 340/324 |
| 3,825,746 | 7/1974 | Kendler et al. | 340/707 X |
| 4,184,044 | 1/1980 | Zwerenz | 178/18 |
| 4,303,914 | 12/1981 | Page | 340/706 |
| 4,306,147 | 12/1981 | Fukuyama et al. | 250/237 R |

FOREIGN PATENT DOCUMENTS 54-126426  10/1979  Japan ............................ 340/710

*Primary Examiner*—David L. Trafton
*Attorney, Agent, or Firm*—Thomas Schneck

[57] ABSTRACT

A position control system employing a movable detector means which communicates energy to and from a pattern of passive, position-related indicia or marks on a surface. In the preferred embodiment the movable detector means includes a light source and a four-quadrant detector, with the surface having a high contrast checkerboard square pattern. The four-quadrant detector will report different states as the detector means is moved across different squares. The states are decoded in a lookup table and electrical signals are generated for controlling X and Y registers of a cursor control or the like.

19 Claims, 8 Drawing Figures

| PATTERN | DET. | | | | POSS. STATE | | | |
|---|---|---|---|---|---|---|---|---|
| | 1 | 2 | 3 | 4 | HA | HB | VA | VB |
|  | 0 | 0 | 0 | 0 | 0 | 0 | 1 | 1 |
|  | 1 | 1 | 1 | 1 | 1 | 1 | 1 | 1 |
|  | 0 | 0 | 1 | 1 | 1 | 1 | 1 | 0 |
|  | 1 | 1 | 0 | 0 | 1 | 1 | 0 | 1 |
|  | 1 | 0 | 0 | 1 | 1 | 0 | 1 | 1 |
|  | 0 | 1 | 1 | 0 | 0 | 1 | 1 | 1 |
|  | 1 | 0 | 1 | 0 | 0 | 1 | 1 | 0 |
|  | 0 | 1 | 0 | 1 | 0 | 1 | 0 | 1 |
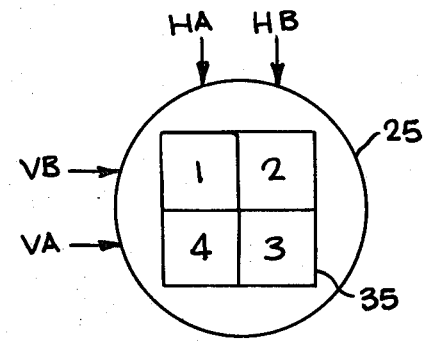
Fig.3a
Fig.3b
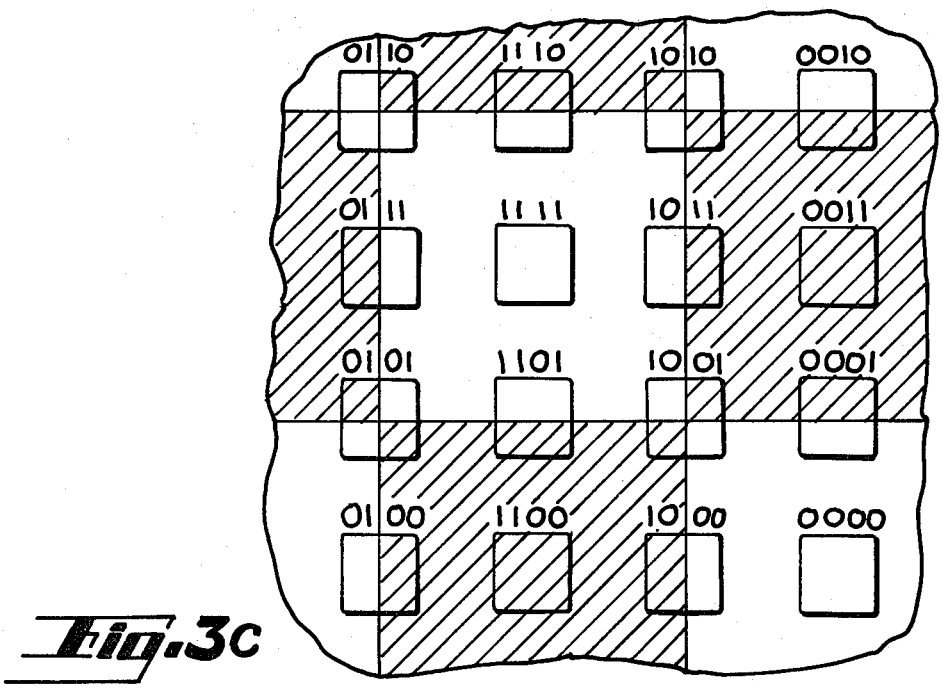
Fig.3c

ELECTRONIC MOUSE

TECHNICAL FIELD

A mouse is a pointing device, typically for use with visual display systems in which a transducer converts translational motion of a housing into a position signal for controlling movement of a cursor associated with a visual display system. More particularly, the present invention relates to such a system in which the transducer is electronic and movement of the housing is sensed by electromagnetic energy.

BACKGROUND ART

A mouse must be distinguished from other cursor control systems, such as light pens and interactive tablets. These are devices in which electrical or electromagnetic energy is communicated from a wand or other movable member to energy receptors within an active surface, grid or the like. On the other hand, a mouse moves over a passive surface, such as a sheet of paper, or the like.

A mouse must also be distinguished from a joy stick control. A joy stick includes a lever, usually connected to a bearing. As the lever is moved and the bearing is rotated correspondingly. Bearing motion is sensed by potentiometers corresponding to different directions of bearing rotation. The output signal from a joy stick may be used for the same purpose as the output signal from a mouse. Both may be used to control a cursor. The distinguishing feature of a mouse is that two-dimensional motion over a surface corresponds directly with two-dimensional motion of a cursor in a graphic display.

A mouse should also be distinguished from bar code systems. In those systems, bar code is applied to a surface for indicating data, such as type of merchandise, price and manufacturer. The bar code typically produces an analog signal which may be read optically or magnetically. In U.S. Pat. No. 4,245,152 to Flurry ert al., an ETAB (every transition a bit) code is described. Such systems do not yield positional information, as mice do.

Most of the mice of the prior art are mechanical systems involving wheels or rollers which maintain frictional contact with a surface. For example, U.S. Pat. No. 3,541,541 to D. Engelbart shows a well-known and widely accepted mechanical mouse. There are certain mechanical problems which are inherent with these mice, such as the problem in maintaining good frictional contact with a surface. If a mechanical mouse encounters a slippery portion of a surface, the resulting output signal will be inaccurate.

Mechanical mice use a relatively large number of close tolerance parts and are difficult to make in mass production. Moreover, mechanical mice are subject to mechanical "noise", such as lash and vibration, and require frequent cleaning.

An object of the present invention was to devise a non-mechanical mouse, specifically one which relied upon electromagnetic energy transmitted to and radiated back from a surface in order to translate positional motion relative to the surface into an electrical signal for control of a cursor or similar device.

DISCLOSURE OF INVENTION

The above object has been achieved with a position control system employing three cooperative elements. One element is a movable detector means which communicates electromagnetic energy to and from an indicia pattern on a surface. The detector means includes a detector capable of noting changes in the pattern. In the preferred embodiment, a light source is used to illuminate an optically contrasting pattern and a four-quadrant photosensitive detector is used to detect unique positions in the pattern. A second element is a surface having a repetitive pattern of passive, position-related indicia extending over the surface, such as a checkerboard pattern. A third element is a logic circuit connected to the detector means which uses a lookup table to decode the detector states as the detector means is moved over the surface. These decoded signals are suitable for controlling X and Y registers of a cursor control.

One of the advantages of this system over mechanical mice is that it is relatively simple to manufacture in large quantities because there are no close tolerance parts. Another advantage is that there is little or no mechanical noise and little or no inherent electrical noise. Another advantage is that the present system uses off-the-shelf or easily made components. Still another advantage is that it has the same sensitivity, or perhaps better, than a mechanical mouse. Yet another advantage is that a version of the present mouse is able to detect rotation, while most mechanical mice cannot.

BRIEF DESCRIPTION OF DRAWINGS

FIGS. 3a, 3b and 3c show detector reception and decoding plans.

BEST MODE FOR CARRYING OUT THE INVENTION

Figure 1:
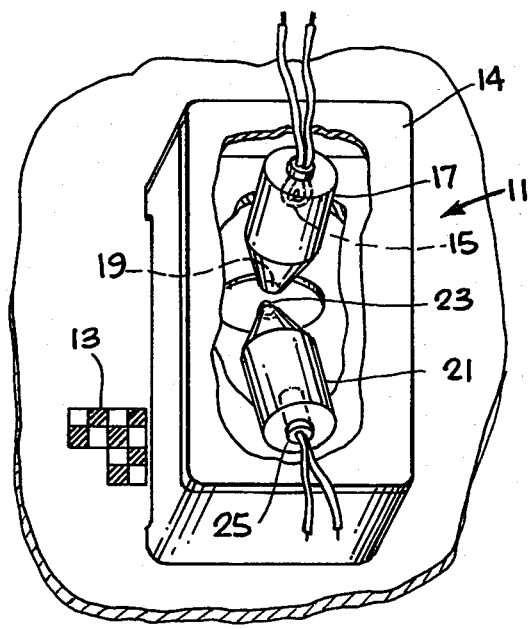
FIG. 1 is a perspective plan view of a detector and a cooperating surface having an indicia pattern in accord with the present invention for sensing translation over the surface.
Figure 2:
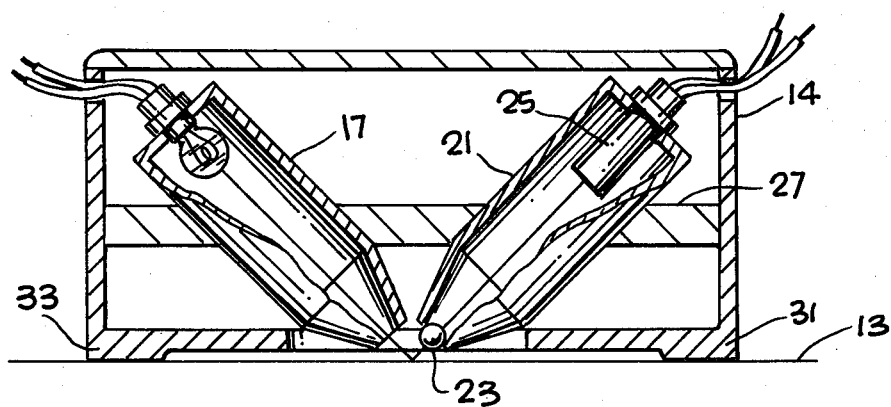
FIG. 2 is a side view of the detector shown in FIG. 1.

FIGS. 1 and 2 show two of three assemblies used in the present invention. The three assemblies taken together form the electronic mouse of the present invention.

A first assembly is the movable detector means 11. This detector means includes a housing 14 containing a light source 15 as well as a photodetector 25. Although light energy is used as a preferred form of electromagnetic energy may be used. The housing is gripped by a human hand and pushed in any direction on the surface, corresponding to the direction and extent to which it is desired to move a cursor, or similar device.

Source 15 may be seen to be mounted within a light tight tube 17 which is aimed downwardly at a spot on surface 13. Tube 17 has a forward light aperture 19 where focused light emerges for illuminating an area slightly larger than one of the squares of the surface, to be described below.

Also mounted in housing 14 is a detector tube 21 having at its forward end an imaging lens 23 which is a glass bead. Lens 23 is mounted so that it is slightly more than one focal length from surface 13. The remainder of tube 21 is generally light tight. At the rear of tube 21 is a four-quadrant detector 25 which receives a magnified image of surface 13 via the imaging lens 23. The spacing between the four-quadrant detector 25 and lens 23 is one wherein the four-quadrant detector is about eight focal lengths from lens 23. The distance is typically about 2 cm., but could be more or less. The diameter of the bead forming imaging lens 23 is approximately 3 or 4 mm., but could be more or less.

In FIG. 2, housing 14 is seen to include a planar central shelf 27 through which tube and detector 21 extend angularly downward and are held in place therein. While specular reflection between the source and detector is preferred, it is not necessary since diffuse reflection is adequate. Housng 14 has thin, low-friction spacers 31 and 33 which make contact with surface 13. Spacers 31 and 33 may be made of Teflon or nylon so that the housing slides easily over the surface. Each of the detectors of the four-quadrant detector is independent of all the others. When placing the housing on surface 13, alignment should be such that the square formed by the four-quadrant detectors is aligned with squares of the surface. However, the housing may be rotated up to 45° in either direction from this nominal orientation without affecting the decoded signal.

A second assembly of the present invention is surface 13, having a horizontal and vertical repetitive pattern of passive, position-related indicia which extend over a portion of the surface. In the preferred embodiment, these indicia are marks of high optical contrast, such as an optically absorptive and reflective pattern. Such a pattern could be a shiny metallic or white surface, with black marks on the surface. The preferred indicia pattern is a checkerboard square, with the edges of each square being approximately 0.5 mm. on a side.

The mouse system of the present invention generates signals which instruct a cursor regarding movement up or down, left or right. There is no particular starting place for the housing on the surface. It may be brought down any place on the surface, so long as there is sufficient room to move the housing in a direction wherein cursor motion is desired. A preferable size for the housing is approximately 6 cm. in width and approximately 8 cm. in length. A preferred size for the surface would be approximately 22 cm. in width and approximately 30 cm. in length. These dimensions are not critical and the housing or surface may be larger or smaller, as needed.

In FIG. 3a, the active area of detector 25 is represented by the square 35. The four quadrants of the active area are numbered in clockwise order, 1, 2, 3, 4. Eight unique patterns which may be viewed by the detectors are illustrated in FIGS. 3b and 3c. In the left column of FIG. 3b is a representation of each possible pattern. The center column of FIG. 3b shows the detector condition, with a dark square being designated by a zero and a reflective square being designated by a one. The order of digits is the order in which the detectors are numbered in FIG. 3a. The two upper quadrants are both designated VB and the two lower quadrants are designated VA (V for vertical), while the right hand column is designated HB and the left hand column is designated HA (H for horizontal).

The desired output from the detectors is four bits, two horizontal bits and two vertical bits. The change in these bits with respect to time is decoded to drive X and Y counters. For horizontal motion, the bits HA (VA) and HB (VB) would have the following sequence for motion to the right (up):

00 01 11 10 00 01 11 . . .

Motion to the left (down) would be denoted by the following sequence:

00 10 11 01 00 10 11 . . .

The state code which is shown in the right hand column of FIG. 3b was selected, as a Gray code, which can be easily decoded with a few gates and a 4 bit latch into signals to drive X and Y counters. Other state codes could have been selected. One of the advantages of the state code illustrated in FIG. 3b is that the state code, or its complement, exactly corresponds to any given detector pattern. Another advantage is that this code is directly accepted by a number of computers made by LISP Machine, Inc. of Cambridge, Mass., Xerox Corporation, and BBN of Cambridge, Mass., as the code is identical to that provided by many mechanical mice.

FIG. 3c reveals possible detector states. Note how use of the Gray code causes a change of state from one state to an adjacent state to have only a single binary digit change. Note also that corresponding states are either identical or complementary. There are eight unique states, all others are complements. For example, the dark square at the bottom of FIG. 3c has the state designation 1100. The dark square to the right of FIG. 3c has the designation 0011, the latter being the complement of the former. Thus, for any detector condition, a unique state corresponds to such a condition, or the complement of such a state. A new state differs from an old state by one binary digit, unless there is a diagonal move, in which case, the new state differs in two binary digits.

The detector size illustrated in FIG. 3c, relative to the checkerboard pattern, may correspond to the actual size ratio. In FIG. 3c, the detector area is approximately 1/16 the area of the checkerboard square. This would be a preferred dimension.

Figure 4:
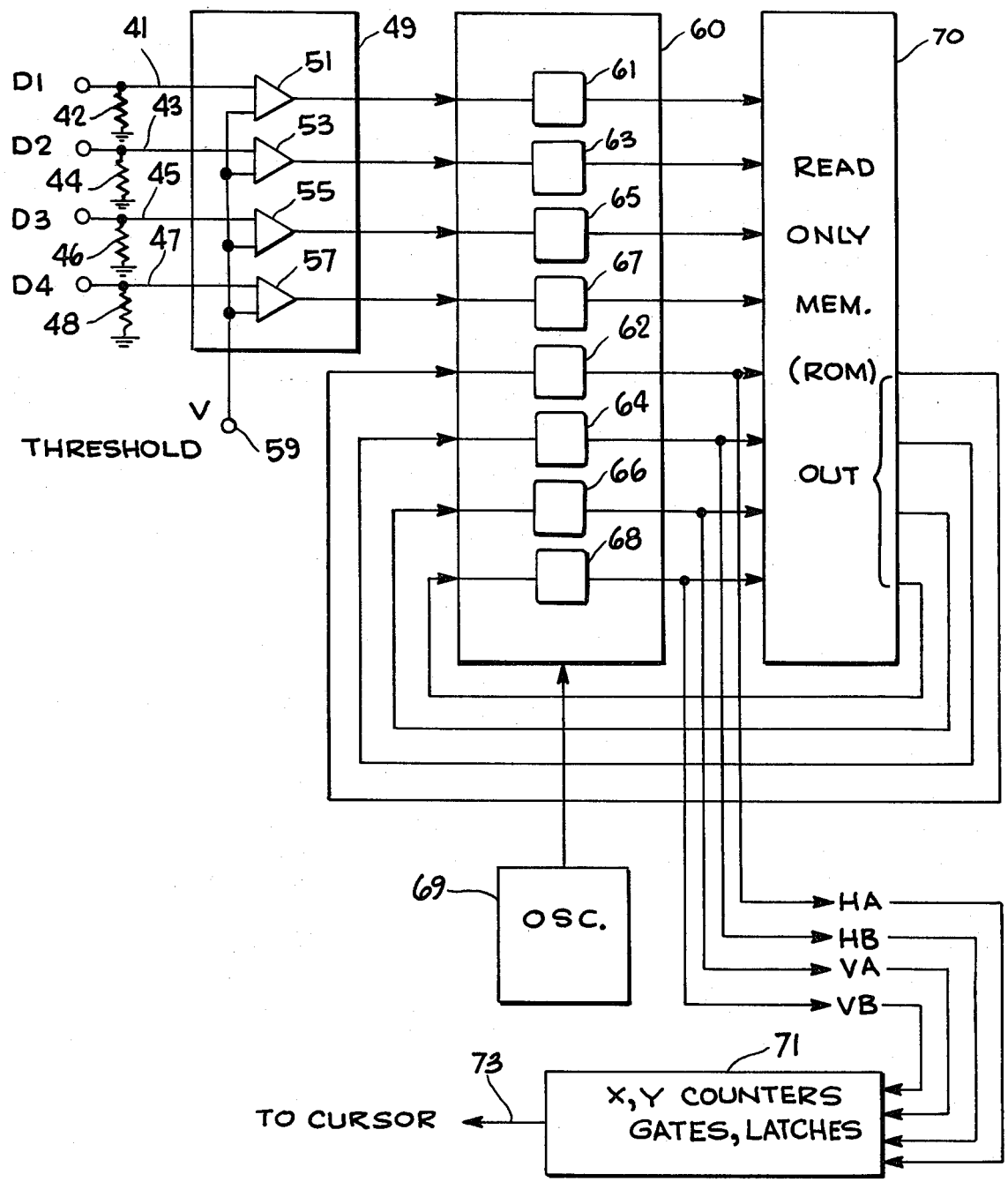
FIG. 4 is an electrical diagram of a logic means in accord with the present invention.

With reference to FIG. 4, a third assembly of the present invention may be seen. This figure shows a diagram of a logic circuit for decoding the detectors. The detector outputs from the four-quadrant detector are labeled D1, D2, D3 and D4. These correspond to the four detector conditions in the middle column of FIG. 3b. The output of each detector is fed along a corresponding line 41, 43, 45, 47 to a quad comparator 49, for example integrated circuit type LM139, wherein corresponding comparators 51, 53, 55 and 57 are connected to each of the detectors. The detector signal applied to each detector is connected in parallel to a high resistance resistor, 42, 44, 46 and 48. Each of these resistors may have a value of 500K ohms in order to provide a proper load resistance to a corresponding diode. Each of the comparators also has an input from a voltage source 59, termed $V_{THRESHOLD}$. The output of each of the comparators does not switch until the threshold voltage is crossed in either direction. Once such a crossing occurs, the output of a comparator where such a crossing occurs changes state and such a state is latched by the latch circuit 60.

This circuit has latches 61, 63, 65 and 67 corresponding and electrically connected to one of the amplifiers. The circuit may be integrated circuit octal latch 74LS373. A 100K Hz oscillator 69 is used to clock the latch circuit. The oscillator may be integrated circuit 74S124. Each of the latch circuits is connected to a read only memory circuit (ROM) 70, which is programmed to produce an output state when presented with the last output state and the current detector outputs. The ROM may be integrated circuit 74S287.

The latch circuit 60, also contains four other latches 62, 64, 66 and 68 which are connected from the output of the ROM back into the input of the ROM through the latches. These latches work in a conventional manner to eliminate a race condition in the feedback loop. There are eight input lines to the ROM, four from the amplifiers through latches 61, 63, 65 and 67 and four from the output of the ROM through the latches 62, 64, 66 and 68. The feedback inputs to the ROM allow a new state to be compared to an old state. The latched output states from latches 62, 64, 66 and 68 are also taken as the input to XY counters 71, which are directly related to the position of the cursor on the screen. This is indicated by the output 73.

Figure 5:
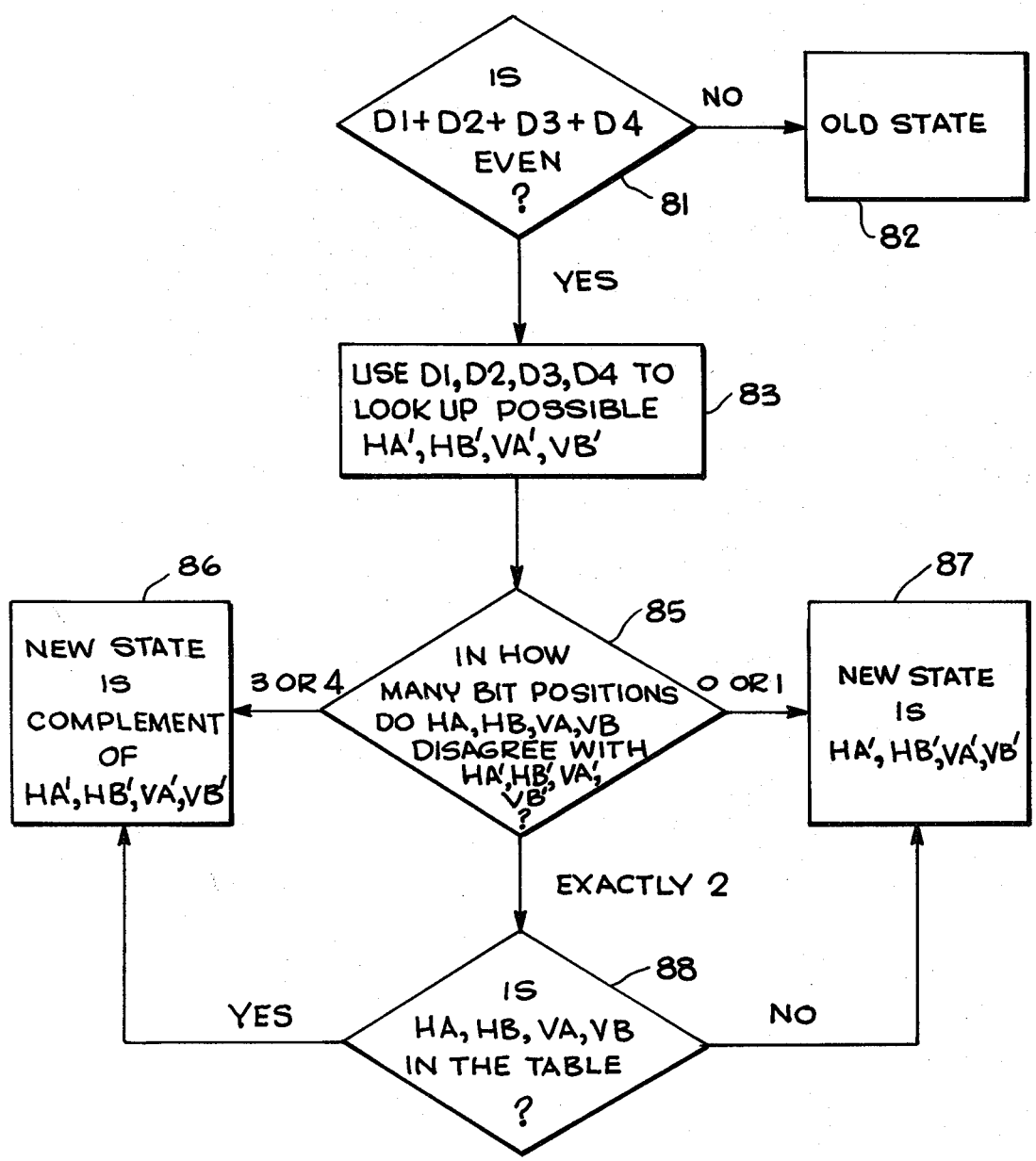
FIG. 5 is a logic flow diagram in accord with the present invention.

In FIG. 5, the ROM programming algorithm may be viewed. In decision block 81, a first assessment is made whether a significant detector pattern exists. In reviewing the center column of FIG. 3b, it will be noted that detector patterns change by two detectors at a time from one square to an adjacent square. This does not require that the detectors are placed on the mouse surface so that the detector pattern is in alignment with the edges of the square. The mouse may be rotated ±45° from nominal without effect. This is because only when *two* detectors have changed polarity is the algorithm able to determine in which direction the mouse has moved. For example, for rightward motion from a white square, detectors 2 and 3 would change state before detectors 1 and 4. The order that detectors 2 and 3 change is not important. In action block 83, the table of FIG. 3b is used to convert the detector outputs to a possible state. Recall that the word "possible" is used because the state may be either the state in the table, or its complement which is not in the table. Thus, the table yields only an even chance of determining the actual state. After determining the new possible state, termed HA', HB', VA' and VB', the algorithm proceeds to the decision block 85 wherein a comparison is made between the number of bit positions in which there is disagreement between the present state, HA, HB, VA and VB in comparison with the new possible state HA', HB', VA' and VB'. If the number of bit positions in which there is a disagreement is three or four, we move to the action block 86 where the new state is determined to be the complement of HA', HB', VA' and VB'. On the other hand, if there is no disagreement or a one-bit position disagreement, the new state is identified in action block 87 as HA', HB', VA' and VB'. The last possibility is that the bit position disagreement amounts to exactly two bit positions. In this case, the algorithm proceeds to decision block 88 to see whether the prior possible state HA, HB, VA and VB is in the table. If the answer is yes, we proceed to action block 86; if no, we proceed to action block 87. In either event, the new state has been defined. As previously mentioned, the output of the ROM is latched and transmitted to X, Y counters.

Figure 6:
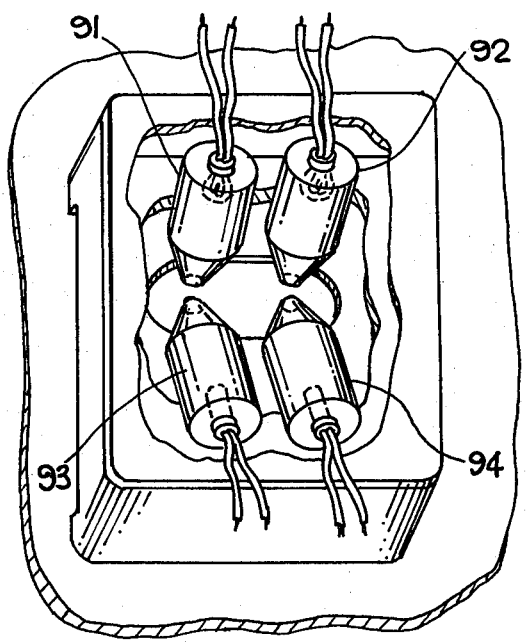
FIG. 6 is a perspective plan view of a dual detector mouse for sensing rotation, as well as translation.

The mouse housing of the present invention is shown to only have one source and detector. However, the light source and detectors are so small and non-interacting that two pairs of sources and detectors can be accommodated in the same housing, as in FIG. 6. This figure shows two sources 91 and 92 spaced from each other and from two detectors 93 and 94. The construction of the sources and detectors is as described with reference to FIGS. 1 and 2. By spacing these at a distance, the electrical circuits described herein can be duplicated so that the motion of two points whose distance from each other is fixed can be determined. By knowing the relative motion of the two points, it is easy to determine the rotational orientation of the mouse so that both translation and rotation of the mouse may be noted.

In the description of the preferred embodiment, reference has been made to optically contrasting indicia patterns as well as optical sources and detectors. However, magnetic indicia on a surface, as well as a magnetic read transducer will work equally well. The magnetic version of the invention has the advantage that a source of illumination is not required. Instead of optically reflective and absorptive regions of the mouse surface, changes in magnetic polarity would be used, as in magnetic information recording. Instead of a checkerboard square pattern, the indicia pattern would have slightly irregular edges which tend to be circular for magnetic indicia. There is no analog to a four-quadrant detector, but by using thin film magnetic heads, it would be possible to make a miniature detector suitable for an electronic mouse in accord with the present invention.

I claim:

1. A position control system for a cursor or the like comprising,
    a surface having a repetitive pattern of passive, position-related contrasting indicia extending over the surface, the indicia defining position states in two directions at the same locations,
    detector means comprising a four-quadrant detector movable over the surface for sensing said passive indicia and generating an electrical signal representing position states in response thereto, and
    electrical memory means connected to the detector means for noting changes in said electrical signal and converting said changes to digital signals in position registers for a cursor or the like.

2. The apparatus of claim 1 wherein said detector means further comprises a second four-quadrant detector movable over said surface and fixed relative to the first four-quadrant detector.

3. The apparatus of claim 1 wherein said indicia forms a regular grid pattern.

4. The apparatus of claim 3 wherein said grid pattern is a checkerboard pattern of squares.

5. The apparatus of claim 4 wherein an edge dimension of said squares is less than one centimeter.

6. The apparatus of claim 1 wherein said electrical memory means comprises a read only memory device.

7. The apparatus of claim 1 wherein said electrical memory means comprises a read only memory device containing a present position state table addressed by said electrical signal for obtaining a present position state.

8. The apparatus of claim 6 wherein said read only memory device is connected to an auxiliary memory unit means for storing a prior position state whereby the prior and present position states can be compared.

9. A position control system for a cursor or the like comprising,
    a repetitive pattern of optically contrasting, position-related indicia extending over an area, the indicia defining position states in two directions at the same locations, a four-quadrant photosensitive detector means movable over the indicia area for optically sensing the indicia on the surface and generating an electrical signal in response thereto, and a read only memory device connected to the detector means, said electrical signal addressing a position state table in the memory device, said position state table, containing old position state and current position state digital detector signals, yielding digital state information suitable for driving X, Y counters and computer means for summing said position states.

10. The apparatus of claim 9 wherein said memory device further comprises a delay line for circulating a prior state from the position state table for comparison with a present state.

11. The apparatus of claim 9 wherein said indicia forms a regular grid pattern.

12. The apparatus of claim 9 wherein said grid pattern comprises a checkerboard pattern of squares.

13. The apparatus of claim 9 wherein an edge dimension of said squares is less than one centimeter.

14. The apparatus of claim 9 wherein said detector means comprises a second four-quadrant detector movable over said surface and fixed relative to the first four-quadrant detector.

15. The apparatus of claim 9 wherein said detector means comprises a four-quadrant detector and said indicia forms a checkerboard square pattern, the detector having a sensing aperture smaller than a square of the checkerboard square pattern.

16. A method of position control for a cursor or the like comprising, disposing a repetitive pattern of position-state, optically contrasting indicia over two directions of a surface, optically scanning said pattern of position-related indicia by detecting four quadrants of the indicia, generating an electrical signal corresponding to the scanned, position-related indicia, correlating said electrical signal with said old and current state data in said state table to form position vectors, and deriving a digital output signal for cursor control from the position vectors.

17. The method of claim 16 wherein said pattern is a checkerboard square.

18. A position control system for a cursor or the like comprising, a surface having a checkerboard square pattern extending over the surface, detector means comprising a four-quadrant detector movable over the surface for optically sensing contrast differences in said checkerboard square pattern and generating an electrical signal in response thereto, and logic means connected to the detector means for noting changes in said electrical signal and converting said changes to digital signals in position registers for a cursor or the like.

19. The apparatus of claim 18 wherein said logic means comprises a read only memory device.

* * * * *

UNITED STATES PATENT AND TRADEMARK OFFICE
CERTIFICATE OF CORRECTION

PATENT NO. : 4,390,873
DATED : June 28, 1983
INVENTOR(S) : Steven T. Kirsch

It is certified that error appears in the above—identified patent and that said Letters Patent is hereby corrected as shown below:

Col. 2, lines 53-55, "Although light energy is used as a preferred form of electromagnetic energy may be used." should read --

Although light energy is used as a preferred form of electromagnetic radiation which communicates energy to surface 13, other forms of electromagnetic energy may be used. --

Signed and Sealed this

Thirteenth Day of September 1983

[SEAL]

Attest:

GERALD J. MOSSINGHOFF

Attesting Officer

Commissioner of Patents and Trademarks